Dec. 10, 1963 P. W. CLARKE 3,114,097
CONTROLLED RECTIFIER REGULATING SYSTEM UTILIZING
A LINEAR RELAXATION TRIGGER CIRCUIT
Filed Sept. 29, 1959 2 Sheets-Sheet 1
FIG. 1
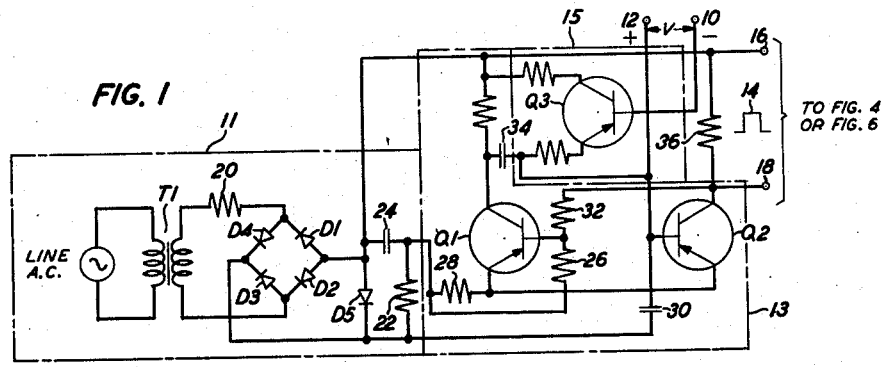
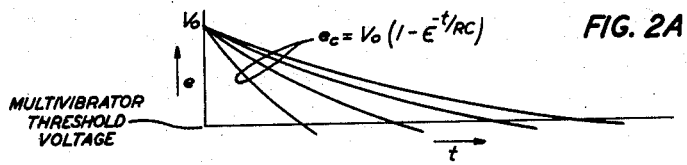
FIG. 2A  $e_c = V_0(1-\epsilon^{-t/RC})$
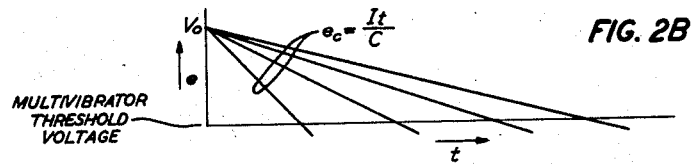
FIG. 2B  $e_c = \dfrac{It}{C}$
FIG. 3
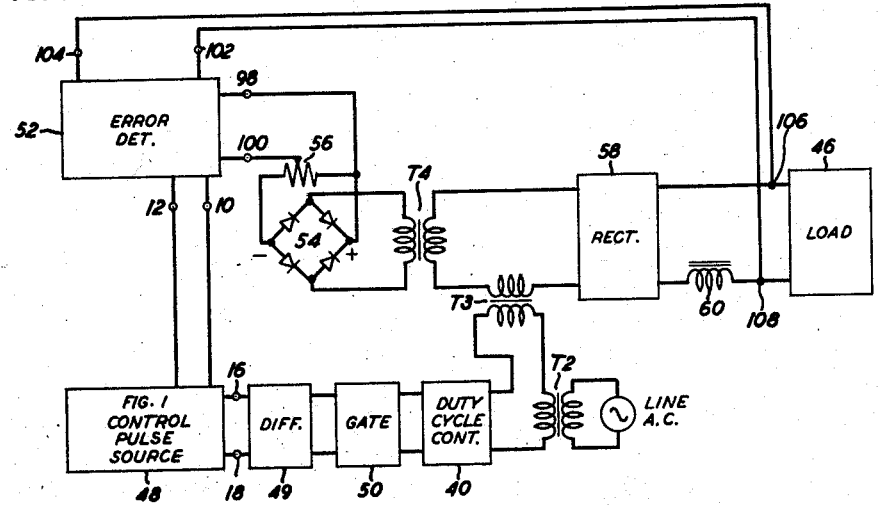
INVENTOR
P. W. CLARKE
BY R. B. Ardis
ATTORNEY Dec. 10, 1963    P. W. CLARKE    3,114,097
CONTROLLED RECTIFIER REGULATING SYSTEM UTILIZING
A LINEAR RELAXATION TRIGGER CIRCUIT
Filed Sept. 29, 1959    2 Sheets-Sheet 2
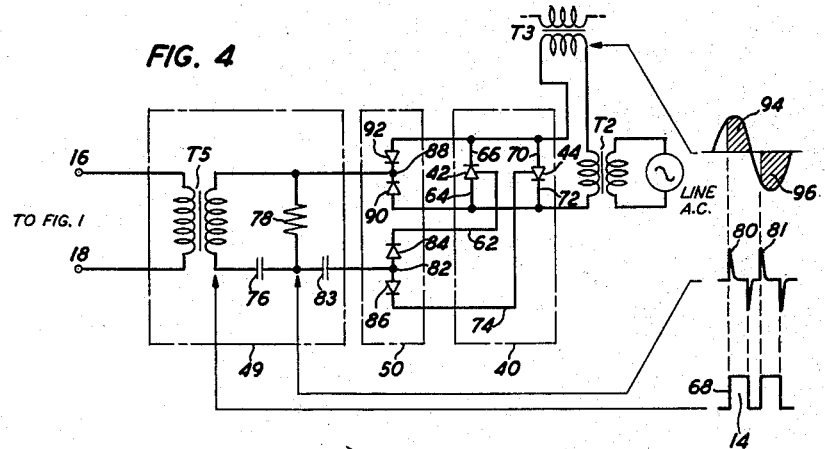
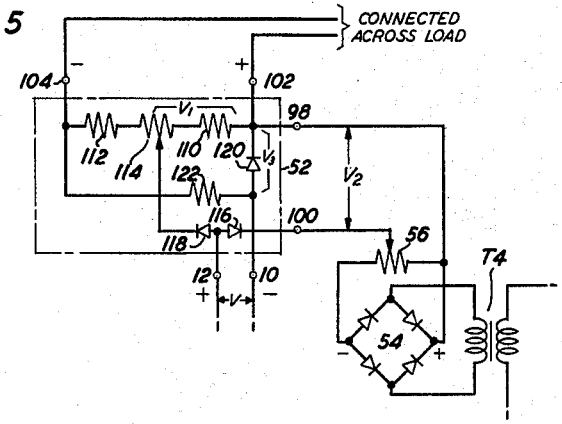
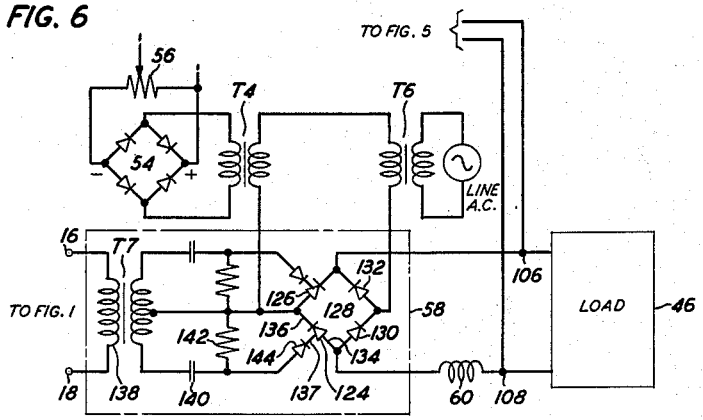
INVENTOR
P. W. CLARKE
BY
R. B. Ardin
ATTORNEY

United States Patent Office 3,114,097
Patented Dec. 10, 1963

3,114,097
CONTROLLED RECTIFIER REGULATING SYSTEM UTILIZING A LINEAR RELAXATION TRIGGER CIRCUIT
Patrick W. Clarke, Jackson Heights, N.Y., assignor to Bell Telephone Laboratories, Incorporated, New York, N.Y., a corporation of New York
Filed Sept. 29, 1959, Ser. No. 843,286
8 Claims. (Cl. 321—18)

This invention relates to controlled rectifier systems for supplying appropriate current to a load at a substantially constant voltage. More specifically, the invention deals with the generation of control signals to maintain this constancy.

With the advent of solid-state thyratrons capable of switching quickly and of conducting high peak currents with low voltage drops, new vistas have been opened in the field of power regulation. See, for example, the article entitled "Solid-State Thyratrons Available Today," by T. P. Sylvan, which appears at page 50 in volume 32, No. 10, of Electronics, dated March 6, 1959. But many of the problems encountered in controlled rectifier systems that employ gas tube thyratrons nevertheless remain. Most notable of these, and one with which the present invention is concerned, is the accuracy with which the thyratrons are initially rendered conductive.

It is therefore a principal object of this invention to improve the accuracy and efficiency of controlled rectifier systems. More specifically, it is an object of the invention to improve the firing accuracy of solid-state thyratrons employed in such systems.

In accordance with the invention, a novel pulse generating circuit is employed to control the duty cycle of the solid-state thyratrons of a control rectifier system. The leading edges of the control pulses generated by the circuit are advanced or delayed accurately in accordance with incremental variations, from a reference, of a voltage proportional either to the load voltage or the load current. The time displacement of the leading edges of the control pulses thus represents the translation of these incremental voltage variations into a function of time. The novel translation process involves a linear relaxation scheme in which the conductivity state of a constant current source determines the relaxation time of the pulse generating circuit.

The drawing, which, when considered with the following description, will impart a better understanding of the invention, consists of the following:

FIG. 1 is a circuit diagram of a pulse generating circuit arranged in accordance with the invention;

FIGS. 2A and 2B are plots, respectively, of multivibrator relaxation curves as provided by the prior art and the present invention;

FIG. 3 is a block schematic circuit diagram of a controlled rectifier system embodying the present invention;

FIG. 4 is a circuit diagram of illustrative gating and duty-cycle control circuits which may be employed in the system of FIG. 3;

FIG. 5 is a circuit diagram illustrating an error-detector circuit which may be employed in the system of FIG. 3; and FIG. 6 is a circuit diagram which illustrates an alternative arrangement for the system of FIG. 3.

To emphasize the functional differences between the various combinations of elements, the circuit of FIG. 1 may be divided into three parts. Section 11 may be called the power supply and synchronizing section, section 13 the pulse forming section, and section 15 the time displacement and pulse shaping section. Throughout the discussion which follows, like reference characters will be used for like elements.

In response to a direct-current voltage applied across the terminals 10 and 12 of section 15, a pulse 14, time-displaced with respect to the zero phase angle of the line alternating current supplied to the transformer T1, appears across the output terminals 16 and 18. As will be seen in due course, this pulse is used to initiate conduction through solid-state thyratrons which control the duty cycle of alternating current supplied thereto. The pulse 14 is generated in the pulse forming section 13 by a relaxation or, more specifically, a monostable multivibrator whose active elements comprise the transistors $Q_1$ and $Q_2$.

Diodes D1, D2, D3 and D4, the rectifying elements of section 11, rectify the line alternating current supplied by way of transformer T1 and resistor 20. A direct-current voltage is thus supplied across the diode D5 and a filter network consisting of resistor 22 and capacitor 24. Diode D5, a Zener diode, regulates the magnitude of the voltage, while the combination of resistor 22 and capacitor 24 smooths it out.

In the pulse forming section 13, the resistor 28 provides the emitter bias voltage for transistors $Q_1$ and $Q_2$. As can be seen, transistors $Q_1$ and $Q_2$ are emitter-coupled. The resistor 32 cross-couples the base of transistor $Q_1$ and the collector of transistor $Q_2$, and capacitor 34 cross-couples the base of transistor $Q_2$ and the collector of transistor $Q_1$. Transistor $Q_1$ is normally in the "off" condition, i.e., is normally non-conductive, while transistor $Q_2$ is normally in the "on" condition.

In its normal state, therefore, the transistor $Q_2$ is saturated and its collector-to-emitter voltage is approximately zero. As can be seen, the resistors 26 and 32 together form a voltage divider; and it is the voltage at their juncture which normally holds the transistor $Q_1$ in the "off" condition. The transistors $Q_1$ and $Q_2$ switch alternately on and off in synchronism with the line alternating current. Thus, as a positive impulse synchronized with the line alternating current takes leave of the capacitor 30 to energize the base of transistor $Q_2$, the transistor switches off. As transistor $Q_2$ switches off, transistor $Q_1$ switches on, since resistors 26 and 28 are proportioned so that the voltage at the base of transistor $Q_1$ is then more negative than that at its emitter.

Now, before transistors $Q_1$ and $Q_2$ interchanged conductivity states, transistor $Q_1$ was in the "off" condition (normal state), as has already been mentioned. Since the collector-emitter path of transistor $Q_1$ is a high impedance while it is non-conductive, a substantial voltage builds up across it. This same voltage is imparted to the capacitor 34, since the voltage across the base-emitter path of transistor $Q_2$ is substantially zero. When, therefore, transistors $Q_1$ and $Q_2$ have interchanged conductivity states so that they are in their abnormal conditions, the $Q_2$ transistor is held (after initially having been turned off by the impulse from capacitor 30) in the "off" condition by the voltage which previously was imparted to capacitor 34. The voltage across the capacitor 34 lingers, despite the substantially zero voltage manifest now across the collector and emitter electrodes of transistor $Q_1$, since the voltage across a capacitor cannot change instantly. Consequently, the transistor $Q_2$ will be switched on at the time the voltage across the capacitor 34 relaxes to the multivibrator threshold voltage (see FIG. 2B), which is here approximately zero volts.

The manner in which the capacitor 34 relaxes to zero volts will determine the accuracy with which the leading edge of the output pulse 14 is created. In accordance with the invention, the rate and manner of relaxation of capacitor 34 is controlled by the flow of current through the collector-emitter path of transistor $Q_3$. The conductivity state of transistor $Q_3$ is, in turn, dependent upon the magnitude of difference signals from an error detector, which will be explored in detail in the discussion of FIG. 5. The time displacement of the leading edge of the square wave 14, which appears across the resistor 36, is thus dependent upon the conductivity state of the transistor $Q_3$ and, ultimately, upon the magnitude of the error detector signals. Consequently, in accordance with the invention, the transistor $Q_3$, in combination with the multivibrator comprising the transistors $Q_1$ and $Q_2$, makes possible an accurate translation into a function of time of any difference signal, appearing across the terminals 10 and 12.

Since the transistor $Q_3$ is, in effect, a constant current source, the relaxation curves of capacitor 34 are linear, as the reader will note from a consideration of FIG. 2B. The constant current source, transistor $Q_3$, permits linear relaxation of capacitor 34 because of the relationship $$e_c = \frac{It}{C}$$

where $e_c$ is the instantaneous voltage across the capacitor at any time $t$, $I$ is the current flowing through the collector-emitter path of transistor $Q_3$, and $C$ is the capacitance of the capacitor 34. FIG. 2A, on the other hand, illustrates the nonlinear or exponential relaxation curves encountered in prior art systems related to the type disclosed here. Thus, for example, in FIG. 1 of Patent No. 2,467,765, which issued to L. F. Mayle on April 19, 1949, the manner in which the multivibrator cross-coupling capacitor relaxes is controlled ultimately by the output voltage of the circuit. Accordingly, the coupling capacitor relaxes exponentially and the instantaneous voltage thereacross at any instant of time is given by the equation, $e_c = V_0(1 - \epsilon^{-t/RC})$, where $V_0$ is the voltage across the capacitor at the initiation of relaxation, $\epsilon$ is the base of natural logarithms, $R$ is the resistance of the relaxation path, and $C$ is the capacitance of the capacitor.

The significance of linear relaxation vis-a-vis nonlinear relaxation is evidenced by the manner in which their respective curves intersect the multivibrator threshold voltage level. This significance is markedly accentuated as the relaxation time increases. Thus, the relaxation curves of FIG. 2A tend to become tangential to the multivibrator threshold level as the relaxation time of the cross-coupling capacitor increases, whereas the intersections of the curves of FIG. 2B are everywhere comparatively sharp and distinct. Since the initiation of the leading edge of pulse 14 is dependent upon the instant at which the cross-coupling capacitor 34 has relaxed to the multivibrator threshold level, it can be seen that the accuracy with which the error-detector signal is translated into a function of time is markedly enhanced by the linear relaxation scheme of the invention.

FIG. 3 illustrates one possible arrangement of a controlled rectifier system embodying the invention. Line alternating current is fed into the transformer T2 and, thence through the duty cycle control circuit 40. It will be seen in the discussion of FIG. 4 that the duty cycle control circuit comprises the solid-state thyratrons 42 and 44. The function of circuit 40 is, as its name implies, to control the duty cycle of the line alternating current and, thus, the amount of electrical energy fed into transformer T3 and ultimately into the load 46.

The duty cycle control circuit 40 is in turn controlled by the control pulse source 48 which, as indicated, is the circuit of FIG. 1. The control pulses are routed to circuit 40 by way of the differentiator circuit 49 and the gating circuitry 50. As has already been explained, the initiation time of the pulse generated by the pulse source 48, is strictly controlled in response to the magnitude of difference signals supplied to the terminals 10 and 12 by the error-detector circuit 52. The error-detector circuit will be explained in greater detail in the discussoin of FIG. 5. It is sufficient at present to note that the difference signals produced by the error-detector circuit 52 are the result of a comparison between a reference voltage and a voltage proportional either to the voltage across the load 46 or to the load current. The reference voltage used in the comparison process is supplied by a Zener diode.

When the load current exceeds the full-load rating of the rectification circuit 58, current limiting is provided by way of the error-detector circuit 52, to which a voltage proportional to the load current is supplied by the network consisting of the transformer T4, the full wave rectifier 54 and the potentiometer 56. The controlled alternating current fed into the secondary of transformer T3 is rectified by the rectifier circuit 58 and thereupon supplied to the load 46. The inductor 60 is a choke coil and serves to filter the direct current flowing through the load circuit.

FIG. 4 illustrates a preferred configuration of the duty cycle control and gating circuits 40 and 50 of FIG. 3. Again, line alternating current is fed into the transformer T2 and thence through the circuit consisting of the secondary winding of transformer T2, the primary winding of transformer T3 and the solid-state thyratrons 42 and 44. The so-called solid-state thyratrons 42 and 44 are, in essence, semiconductor PNPN switches. Each of these switches has a pair of transconductive electrodes and a control electrode. The switch 42, for example, has a control electrode 62 and transconductive electrodes 64 and 66. As indicated in the above-cited Sylvan article, the control electrode may be connected to either the N or the P intermediate region of a PNPN switch. The instants at which switches 42 and 44 are turned on are determined by the time positions of the leading edges of control pulses supplied to transformer T5.

The voltage-current characteristic for each of the PNPN switches 42 and 44 is similar to that of an ordinary silicon diode, in that it is such as to provide essentially an open circuit when the anode-to-cathode voltage is negative. As can be seen, the transconductive electrodes 64 and 70 are anodes and the electrodes 66 and 72 are cathodes. The forward portion of the characteristic is such that it will block positive anode-to-cathode voltages below a critical breakover voltage, provided that no firing pulse is supplied to the control electrodes 62 and 74.

In the circuit of FIG. 4, the voltage supplied across the transconductive electrodes of the switches 42 and 44 is always less than the critical breakover voltage. Thus the switches 42 and 44 will cease to block current and become conductive only when firing pulses are supplied to their respective control electrodes.

The control pulse 14, which, as we have seen, is generated by the control pulse source 48 of FIG. 3, in response to a difference signal produced by the error-detector circuit 52, is fed into the transformer T5 and thence through the differentiator circuit 49 which consists of the capacitor 76 and the resistor 78. The resultant wave form is a train of sharply-peaked pulses, exemplified by the spike 80 whose leading ledge conforms to the leading edge 68 of the control pulse 14. This spike constitutes a firing pulse which is supplied through capacitor 83 to the juncture 82 of the gating diodes 84 and 86.

It should be noted that as the magnitude of the current fed into the control electrode of a PNPN switch is increased, the effective breakover voltage of the transconductive electrodes is decreased. The magnitude of the firing pulses supplied to the switches 42 and 44 is therefore such as to reduce the effective breakover voltages of these devices below some specified value.

It is important that the firing pulse be applied to the solid-state thyratron which is ready to fire. The arrangement of diodes 84, 86, 90 and 92 assures this. As is true of the ordinary two-terminal switching diode, each of the three-terminal devices 42 and 44 can be turned on by applying a forward-biasing voltage across its transconductive electrodes which exceeds its breakover voltage. Unlike the ordinary diode, however, the three-terminal PNPN switch can be turned on as well by forward-biasing the control electrode with respect to the cathode at a time when the transconductive electrodes are also forward-biased by a few volts, commonly known as the holding voltage. It should be understood that this requirement that the transconductive electrodes also be forward-biased imposes no practical restriction on the firing range, since the line alternating current has a peak value many times greater the holding voltage.

Since the forward-biasing voltage across the transconductive electrodes of the devices 42 and 44 is such that it will never exceed the breakover voltage, the devices will be fired only by firing voltages supplied at appropriate times to their respective control electrodes. The forward impedance of the devices is very high even during periods when they are being forward-biased by the line alternating current. The input impedance at the control electrodes of each of the devices 42 and 44 is, on the other hand, very low.

In order to steer pulses to the devices 42 and 44, the circuit employs a gating network 50 comprising the diodes 84, 86, 90 and 92. This method of gating the firing pulses is advantageous in that only one gating network need be used in conjunction with both of the devices 42 and 44.

Note that when the device 44 is forward-biased by the line alternating current, i.e., when its anode-to-cathode voltage is positive, and the firing pulse 80 is supplied to juncture 82, the diodes 86 and 90 become forward-biased and device 44 fires to permit a quantum of energy 94 to be transferred to the rectification and load circuits of FIG. 3. The device 42, on the other hand, is reverse-biased during this period by the half-sinusoid of line alternating current enveloping the energy quantum 94, so that diode 84 is also reverse-biased and the control electrode 62 is deactivated.

When, however, it is the device 42 and not the device 44 that is being forward biased by the line alternating current and the firing pulse 81 is supplied to juncture 82, the diodes 84 and 92 are forward-biased (diode 86 is reverse-biased), the device 42 fires, and a quantum of energy 96 is transferred to the load circuit.

Notice that the area defined by the quanta of energy 94 and 96 is dependent upon the initiation times of the firing pulses 80 and 81; and that these initiation times are, in accordance with the invention as discussed above in connection with FIG. 1, accurate functions of variations of the load voltage (or, as will be seen, of a voltage proportional to the load current) from a reference voltage. It is well to note further that in the arrangement of FIG. 4, the PNPN devices 42 and 44 are not conductively included in the load circuit. This arrangement is especially desirable in systems using load currents which exceed the ratings of available solid-state thyratrons.

FIG. 5 is a detailed illustration of an error-detector circuit which may be employed by the system of FIG. 3. Since a controlled rectifier system ordinarily must not only take cognizance of variations in load voltage but must also act to prevent the load current from exceeding a permissible maximum, the circuit of FIG. 5 is designed to perform both of these functions.

Current flowing through the secondary winding of the load transformer T3 of FIG. 3 is supplied to the error-detector circuit by way of the transformer T4 the full wave rectifier 54, and the potentiometer 56. A voltage $V_2$, proportional to the load current, is thus made available across the terminals 98 and 100, which are respectively connected to the fixed and variable terminals of the potentiometer 56. The potentiometer 56 is adjusted so that the diode 116 will become forward-biased and the diode 118 reverse-biased whenever the load current reaches a maximum permissible value.

The leads 102 and 104 are bridged across the load circuit 46 of FIG. 3 at the junctures 106 and 108 in order to impress the load voltage across the resistance network consisting of the fixed resistors 110 and 112 and the potentiometer 114. A voltage $V_1$, proportional to the load voltage, is thus made available across the variable terminal of potentiometer 114 and the lead 102.

The voltage $V_3$ is a reference voltage and is the breakdown voltage of the Zener diode 120. Resistor 122 limits the amount of current that is passed through Zener diode 120. This current is such as to maintain operation of the diode within its breakdown region. Within this region, the reference voltage $V_3$ is constant for all practical purposes.

The voltage V, which appears across the terminals 10 and 12, is the difference between the reference voltage $V_3$ and either the voltage $V_1$, which is proportional to the load voltage, or the voltage $V_2$, which is proportional to the load current. Whether V represents the difference between $V_3$ and $V_1$ or $V_2$ is dependent upon the conductivity states of the diodes 116 and 118.

When the voltage $V_1$ is more negative than the voltage $V_2$, diode 118 is forward-biased and diode 116 reverse-biased. The system (of FIG. 3) is then voltage regulating, so to speak, in that the output voltage V is the difference between the reference voltage $V_3$ and the voltage $V_1$, which, as we have seen, is proportional to the load voltage.

When, however, $V_2$ becomes more negative than $V_1$, diode 116 becomes forward-biased and diode 118 reverse-biased. When the diodes are so biased, the system is disposed to be a current regulator, since the voltage V represents the difference between the reference voltage $V_3$ and the voltage $V_2$, which is proportional to the load current.

The control rectifier of FIG. 6, shown only partially, is an alternative arrangement for the system of FIG. 3 and is preferable whenever solid-state thyratrons having high current capacity sufficient to handle the requisite load current are available. It can be seen that while the duty cycle control and rectification circuits 40 and 58 of FIG. 3 are parts of separate circuits, their functions are combined in the load circuit of FIG. 6. Thus, PNPN switches 124 and 126 are an integral part of the full wave rectifier 128, which further includes the diodes 130 and 132.

The switches 124 and 126 operate in much the same manner as do the switches 42 and 44 of FIG. 4. Accordingly, when the line alternating current supplied by way of the transformer T6 is such as to forward-bias the transconductive electrodes 134 and 136 of switch 124, the switch will be fired by a firing pulse supplied to the control electrode 137. The firing pulse is the product of a control pulse supplied to the primary winding 138 of transformer T7, differentiated by the differentiator network consisting of the capacitor 140 and the resistor 142, and passed through the forward-biased diode 144 to the control electrode 137.

Thus in accordance with the invention, variations, from a reference, of a voltage proportional to either the load current or the load voltage are transferred accurately into a function of time to control, by means of the solid-state thyratrons 124 and 126, the amount of energy supplied to the load.

Although the present invention has been described with reference to specific embodiments, they should be considered as illustrative, for the invention comprehends also such other embodiments as come within its spirit and scope.

What is claimed is:

1. A regulated rectifier circuit interconnecting a source of alternating-current energy and a load to supply direct-current energy to said load, comprising: an input circuit and an output circuit and energy coupling means to intercouple said input and output circuits; a plurality of semiconductor switches each having transconductive electrodes and a control electrode, enablement of said control electrodes serving merely to initiate conduction through said transconductive electrodes; said input circuit serially including said source of alternating-current energy and the transconductive paths of said switches; rectifier means to convert said alternating-current energy to direct-current energy; said output circuit including said load and said rectifier means; and regulating circuit means intercoupling said output circuit and said control electrodes of said switches to initiate conduction through said transconductive electrodes in accordance with changes in the magnitude of direct-current energy being delivered to said load, said regulating circuit means comprising means to compare a voltage proportional to a parameter of the energy supplied to said load, with a reference voltage to produce a difference voltage, and means for generating pulses displaced in time in accordance with the magnitude of said difference voltage to enable said control electrodes of said switches, said last-named means including a constant current source to determine said time displacement and itself including a transistor having base, emitter and collector electrodes, means to supply said difference voltage across said base and emitter electrodes, and gating means to interconnect said collector electrode and said control electrodes of said switches.

2. A controlled rectifier system for supplying direct-current energy to a load at a substantially constant voltage level comprising a source of alternating-current energy, an input circuit, a load circuit including said load, transformer means intercoupling said input circuit and said load circuit, and a regulating circuit also intercoupling said load circuit and said input circuit for controlling the amount of said direct-current energy to be supplied to said load; said input circuit including means responsive to said regulating circuit for controlling the duty cycle of said alternating-current energy; said load circuit including rectification means for rectifying said alternating-current energy; and said regulating circuit including an error detector circuit connected across said load for detecting incremental variations from a reference voltage of a voltage proportional to a parameter of the energy supplied to said load, means for generating pulses synchronized with said alternating-current energy, a constant current circuit responsive to said incremental voltage variations for translating said voltage variations into a function of time manifested by variations in the time position of leading edges of said pulses, and gating means for conveying said pulses to said duty-cycle control means to regulate the amount of energy conducted through said duty-cycle control means.

3. A system in accordance with claim 2 in which the impedance of said constant current circuit is varied in accordance with said incremental voltage variations.

4. A system in accordance with claim 2 and, in addition, a differentiator circuit for differentiating said pulses before application to said duty-cycle control means.

5. A controlled rectifier system for supplying direct-current energy to a load at a substantially constant voltage comprising a source of alternating-current energy, a rectification circuit inlcuding a pair of three-electrode PNPN switches for controlling the amount of energy supplied to said load, one of said electrodes being a control electrode for controlling the conduction of energy through the other two, a load circuit including said load and said rectification circuit, and a regulating circuit for supplying stimuli in the form of pulses to the control electrodes of said switches; said regulating circuit comprising an error detector connected across said load to detect incremental variations of the voltage thereacross from a reference voltage, means to maintain said reference voltage, a relaxation pulse generator for generating pulses synchronized with said alternating-current energy, a constant source for determining the time-displacement of the leading edges of said pulses in response to the magnitude of said incremental voltage variations, means for relaxing said pulse generator through said constant current source, and gating means for conveying said pulses selectively to the control electrodes of said switches to activate said switches.

6. A system in accordance with claim 5 in which said error detector includes means for translating the current through said load into a voltage proportional to said current, and gating means to initiate comparison of said last-named voltage with said reference voltage and to halt comparison of said load voltage with said reference voltage when said load current exceeds the full-load current rating of said rectification circuit, whereupon said voltage variations to which said constant current source is responsive become differences between said reference voltage and said voltage proportional to said load current.

7. In combination, a source of alternating-current energy, switching means connected to said source for deleting predetermined portions of successive half-cycles of said alternating-current energy to produce a second alternating-current energy waveform, means for rectifying said second alternating-current energy waveform to produce direct-current energy, means for applying said direct-current energy to a load, a capacitor, means for periodically charging said capacitor at a substantially constant rate, means for regulating the magnitude of said rate in accordance with the magnitude of the direct-current energy being delivered to said load, means for generating a pulse whenever the charge on said capacitor equals a predetermined value, and means for applying said pulse to said switching means whereby the magnitude of said deleted portions is altered in accordance with variations in the magnitude of the direct-current energy being delivered to the load.

8. A controlled rectifier system which comprises, in combination, a source of sinusoidally varying electrical energy, switching means for eliminating portions of particular half-cycles of said energy to produce a waveform of decreased energy, means for converting said waveform into direct-current energy, means for delivering said direct-current energy to a load, a capacitor, a constant current source for repeatedly charging said capacitor at a substantially constant rate to produce a linearly varying voltage across said capacitor, said constant current source being provided with means responsive to variations in the magnitude of the direct-current energy being delivered to said load for varying said charging rate in accordance therewith, means to generate a pulse whenever said linearly varying voltage equals a predetermined value, and means to actuate said switching means in response to said pulse whereby the magnitude of each of said eliminated portions is regulated.

References Cited in the file of this patent

UNITED STATES PATENTS

| | | |
|---|---|---|
| 2,567,797 | Anderson | Sept. 11, 1951 |
| 2,598,516 | Dickinson | May 27, 1952 |
| 2,726,356 | Rockafellow | Dec. 6, 1955 |
| 2,750,502 | Gray | June 12, 1956 |
| 2,906,874 | Faymoreau | Sept. 29, 1959 |
| 2,920,247 | Fisher | Jan. 5, 1960 |
| 2,945,785 | Raamot | July 12, 1960 |
| 2,957,119 | Carlson | Oct. 18, 1960 |
| 2,977,523 | Cockrell | Mar. 28, 1961 |